United States Patent Office 3,271,275

Patented Sept. 6, 1966

3,271,275

ELECTRODEPOSITION OF A MAGNETIC TERNARY ALLOY OF IRON-NICKEL-ARSENIC

Guy Di Guilio, Philadelphia, Pa., and Joseph S. Mathias, Riverton, N.J., assignors to Sperry Rand Corporation, New York, N.Y., a corporation of Delaware No Drawing. Filed Oct. 31, 1962, Ser. No. 234,519
10 Claims. (Cl. 204—43)

The present invention relates generally to an improved magnetic film particularly adapted for use as a memory element in a data processing system, and more particularly to an improved technique for electrolytically depositing magnetic films of this type which consist essentially of a ternary alloy of nickel-iron-arsenic.

In the preparation of magnetic films which are designed for use in memory applications with data processing systems, it is generally desirable that the films exhibit properties which permit switching at the lowest reasonable energy requirement possible, the energy level being consistent with the stability requirements of the memory film or core. It is also generally desirable that the film have a composition which provides for a minimal, if any, magnetostriction, in order that any memory element will have suitable stability and consistency, and will operate unformly in its switching action.

While it has been proposed in the past to prepare electroplated nickel-iron-base alloy films for magnetic data-storage devices, these films have normally had high values of $H_k$, this figure representing the value of the anisotropy field. The values of transverse field required for rotational switching are a function of the $H_k$, and for memory devices, reasonably low $H_k$ values are desired. In accordance with the technique of the present invention, improved electroplated nickel-iron-arsenic magnetic data storage devices may be prepared which have low $H_k$ values, these values not being sufficiently low, however, to disturb the memory characteristic or capability of the films. In this regard, for films prepared in accordance with the present invention and having a useful thickness, the values of $H_k$ normally lie between 1.8 and 2.5 oersteds, this value permitting rotational switching of the core at a relatively low magnitude of energy, the entire switching operation being accomplished with a lower overall energy requirement than would otherwise be necessary with films having significantly higher $H_k$ values. In addition, the $H_k$ values are sufficiently high so that the films are not readily disturbed by stray magnetic fields of modest intensity. The system design aspects are accordingly not adversely affected. The films having sufficient stability to permit their use in a variety of conventional film array arrangements.

In addition to the specific values of the anisotropy field $H_k$, the $H_c$ values are likewise important, this figure relating to the coercive field of the film. Ideally, for most switching operations, the value of $H_c$ should be somewhat less than the value of $H_k$, the range of the $H_c/H_k$ ratio values preferably being between 0.5 and 1. With this particular ratio range, and with presently available switching equipment, switching techniques utilized and the like, it has been found that the switching characteristics of a film having these characteristics are very desirable. The present invention permits preparation of films having consistent $H_c/H_k$ ratios ranging from between 0.65 and 0.85 When the films are "inverted," that is, the value of $H_c$ exceeds the value of $H_k$, the films produced have been found to generally exhibit poor rotational switching characteristics. In addition, it has been generally found that poor dispersion properties exist in inverted films.

In accordance with the technique of the present invention, an improved electroplating technique is provided for the formation of thin nickel-iron-arsenic films. One important feature of the invention is the provision of a critical range of concentration ratios for the plating constituents in the bath, these concentration ratios being employed in order to prepare the improved nickel-iron-arsenic films, these films having the low and controlled values of $H_k$ together with optimum values for $H_c$. Certain conventional nickel-iron solutions which are utilized to prepare electroplated films produce a magnetic member having an unusually high $H_k$ value, this value generally being substantially higher than those achieved in connection with the present invention and ranging up to about 5 oersteds and higher.

In performing the technique of the present invention, nickel sulfate, ferrous sulfate, together with sodium arsenite are included in an acid plating bath along with certain conventional plating bath additives. These additives including boric acid, saccharin, sodium lauryl sulfate, and sodium chloride are to be considered as conventional additives only, these being utilized in order to enhance the plating characteristics of and control the ultimate plating of the film, and are otherwise ordinarily used to control or modify the various characteristics of plating. These additives are conventional in the plating art and do not in and of themselves provide a part or portion of the present invention. It will be appreciated that other specific plating additives may be employed in order to achieve the results of the present invention. The current density employed preferably ranges between 2 and 10 ma./cm.$^2$, and is preferably about 6 ma./cm.$^2$.

Therefore, it is an object of the present invention to provide an improved solution and electroplating method for the formation of thin nickel-iron-arsenic ternary alloy films, these films having controlled and desirable values of $H_k$ and $H_c/H_k$ ratios, and being particularly valuable for use as thin magnetic films for certain memory applications.

It is a further object of the present invention to provide an improved electroplating solution for the formation of thin nickel-iron-arsenic ternary alloy films wherein certain critical concentration ratios are employed for controlling the nature of the deposition of electrodeposited film to an optimum degree.

It is yet a further object of the present invention to provide an improved electroplating method or technique for the formation of thin nickel-iron-arsenic ternary alloy films which are particularly adaptable for use in magnetic memory applications, the technique employing the use of an acid electroplating bath including nickel-iron, and arsenic, and being particularly adaptable for use in plating thin metallic alloy films of these materials.

Other and further objects of the present invention will become apparent to those skilled in the art upon a study of the following specification, and appended claims.

In accordance with the preferred modification of the present invention, an electroplating bath is prepared having a composition range as is indicated hereinbelow:

| | Gm./l. |
|---|---|
| $NiSO_4 \cdot 6H_2O$ | 218 |
| $FeSO_4 \cdot 7H_2O$ | 4.6–7.4 |
| $NaAsO_2$ | 0.2–1.0 |
| Saccharin | 0.8 |
| Sodium lauryl sulfate | 0.2 |
| $H_3BO_3$ | 25 |
| NaCl | 9.7 |

The electrodeposition is carried out at room temperature, such as a temperature in the range 22–30° C., at a current density of 2 to 10 ma./cm.$^2$ at a pH of 2 to 5. In order to achieve the desired current density the potential ranges between about 1.5 volts and 4.8 volts depending on the specimen size. Under these conditions, films having $H_k$ values of between 1.8 and 2.5 oersteds and having $H_c/H_k$ ratios of between 0.65 and 0.85 are obtained. The composition of typical films prepared in accordance with these examples are as follows:

| Component: | Amount, gm./l. |
|---|---|
| Nickel | 75 to 85 |
| Iron | 12 to 25 |
| Arsenic | 1 to 10 |

In one typical electroplating operation, a solution having the following composition was employed:

| Component: | Amount, Gm./l. |
|---|---|
| $NiSO_4 \cdot 6H_2O$ | 218 |
| $FeSO_4 \cdot 7H_2O$ | 6.0 |
| $NaAsO_2$ | 0.4 |
| Saccharin | 0.8 |
| Sodium lauryl sulfate | 0.2 |
| $H_3BO_3$ | 25.0 |
| NaCl | 10.0 |

pH of the bath=2.2.
Temperature, 25° C.

A current density of 6 ma./cm.$^2$ was utilized in connection with this bath.

The composition of the films prepared in accordance with this specific example were typically as follows:

| Element: | Percentage composition |
|---|---|
| Nickel | 80 to 82 |
| Iron | 15 to 17 |
| Arsenic | 1.2 to 4.8 |

Under the conditions outlined above, the film plated for a period of 50 seconds is about 800 A. in thickness, the film plated for a period of 150 seconds is about 2500 A. in thickness.

Referring now to the individual ingredients in the plating bath, it will be appreciated, of course, that the anion of the nickel and iron salt is not particularly critical, it being appreciated that the ratio of nickel to iron in the bath is the critical feature. In this regard, the $Fe^{++}/Nn^{++}$ concentration ratio ranges from between about 0.02 up to about 0.032, based upon the normalities of these ions in solution. With regard to the concentration ratio of the arsenite ion to nickel, based upon normalities, the ratio $AsO_2^-/Ni^{++}$ ranges from between about 0.0009 up to about 0.0047. It will be appreciated that the various concentration ranges set forth herein will normally enable one to obtain the electroplated thin films in accordance with the present invention, these films having the desirable properties of magnetic thin films for memory applications.

With regard to the normality terms used herein, a one N solution of $Fe^{++}$ includes one-half gram-molecular-weight of the salt, for example, $FeSO_4$; a one N solution of nickel $Ni^{++}$ one-half gram-molecular-weight of the salt, for example $NiSO_4$; a one N solution of $AsO_2$ includes one-gram-molecular weight of the salt, for example, $NAAsO_2$. While the arsenic is ultimately reduced from an oxidation state of 3 to the free metal, the normalities as expressed herein do not take account of the ultimate plating reaction through which the arsenic goes. In other words, the term normality as used herein relates solely to the concentration of the various ions of the individual salt solutions with sole reference being to the salt ions or radicals per se.

With regard to the arsenite, it will of course be appreciated that the particular cation employed is not critical other than that it should not be platable cation. For this purpose, any of the alkaline earth metals such as sodium arsenite, potassium arsenite, or the like may be utilized.

The pH of the plating bath has been indicated hereinabove. It will be observed that the bath is mildly on the acid side, a pH of from 2 to 3 being considered desirable for plating the films in accordance with the technique of the present invention. The temperature range is not critical, and it will be appreciated that good results may be achieved with holding the bath at substantially or near room temperature.

With regard to the current density employed, it will be observed that the range of between 2 and 10 ma./cm.$^2$ has been indicated. It will be appreciated that if a current density substantiallly lower than the minimum indicated is employed, films having a low iron content with negative magnetostrictive properties may develop. If, on the other hand, a current density is employed which substantially exceeds the maximum indicated hereinabove, films having a high iron content with positive magnetostrictive properties may develop.

The base substrate employed is preferably an insulating substance such as glass or plastic, ordinary microslide glass being preferred. The surface of the substrate is initially cleaned of all contaminants, and is preferably polished to present a smooth plating surface. The substrate is then coated with a layer of gold or chromium-gold, the latter including a pair of layers wherein an initial layer of chromium is applied followed by the application of a layer of gold. For example, the substrate surface normally includes a plurality of individually spaced circular plated areas of about 100 A. of chromium covered by 100 A. of gold. Conventional evaporation techniques are employed to coat the substrate. In lieu of an insulated substrate, it is, of course possible to employ a polished metallic surface as a substrate, if desired.

When use as a magnetic memory core is anticipated, it is in certain instances desirable that the film be plated in the presence of an external magnetic field, this field being applied during the plating operation. It has been found that the application of such a magnetic field enhances the uniaxial anisotropy characteristics of the film. In this connection the field is applied to the film being plated along the plane of the film, the field preferably having a strength of about 25 to 35 oersteds.

It will be appreciated that the specific examples listed hereinabove are provided for purposes of illustration only and are not to be otherwise construed as a limitation upon the scope of the present invention. It will be further understood, therefore, that those skilled in the art may depart from the specific examples without actually departing from the spirit and scope of the present invention.

What is claimed is:

1. The method which comprises electrolytically depositing thin magnetic Ni-Fe-As films upon a substrate to be coated by passing current through an aqueous acidic plating bath to said substrate to electrolytically deposit said magnetic film thereon, said bath consisting essentially of $Ni^{++}$, $Fe^{++}$ and $AsO_2^-$ ions, the concentration of said ions in the bath being such that the $Fe^{++}/Ni^{++}$ normality ratio ranges from about 0.020 to about 0.032, and the $AsO_2^-/Ni^{++}$ normality ratio ranges from about 0.0009 to about 0.0047.

2. The method which comprises electrolytically depositing thin magnetic Ni-Fe-As films upon a substrate to be coated by passing current through an aqueous acidic plating bath to electrolytically deposit said film on said substrate, said bath consisting essentially of $Ni^{++}$, $Fe^{++}$ and $AsO_2^-$ ions, the concentration of said ions in said bath being such that the $Fe^{++}/Ni^{++}$ normality ratio is about .026, and the $AsO_2^-/Ni^{++}$ normality ratio is .002.

3. The method which comprises electrolytically depositing thin magnetic Ni-Fe-As films upon a substrate to be coated by passing current through an aqueous acidic plating bath to electrolytically deposit said film on said substrate, said bath consisting essentially of $Ni^{++}$, $Fe^{++}$ and $AsO_2^-$ ions, the concentration of said ions in said bath being such that the $Fe^{++}/Ni^{++}$ normality ratio ranges from about 0.020 to about 0.032, and the $AsO_2^-/Ni^{++}$ normality ratio ranges from about 0.0009 to about 0.0047, the pH of the bath being between about 2 and 5.

4. The method which comprises electrolytically depositing thin magnetic Ni-Fe-As films upon a substrate to be coated by passing current through an aqueous acidic plating bath to electrolytically deposit said film on said substrate, said bath consisting essentially of $Ni^{++}$, $Fe^{++}$ and $AsO_2^-$ ions, the concentration of said ions in said bath being such that the $Fe^{++}/Ni^{++}$ normality ratio ranges from about 0.020 to about 0.032, and the $AsO_2^-/Ni^{++}$ normality ratio ranges from about 0.0009 to about 0.0047, the current density during plating being maintained between about 2 and 10 ma./cm.$^2$.

5. The method as set forth in claim 4 being particularly characterized in that the current density is maintained at about 6 ma./cm.$^2$.

6. An aqueous acidic plating bath for electrolytically depositing thin magnetic films of Ni-Fe-As, said bath consisting essentially of $Fe^{++}$, $Ni^{++}$ and $AsO_2^-$ ions, the $Fe^{++}/Ni^{++}$ normality ratio being between about 0.020 and 0.032, and the $AsO_2^-/Ni^{++}$ normality ratio being between about 0.0009 and 0.0047.

7. The plating bath as defined in claim 6 being particularly characterized in that the $Fe^{++}/Ni^{++}$ normality ratio is about .026 and the $AsO_2^-/Ni^{++}$ normality ratio is about .002.

8. The plating bath as set forth in claim 6 being particularly characterized in that the pH of the solution is maintained between about 2 and 5.

9. The method as set forth in claim 1 being particularly characterized in that a strong magnetic field is applied in one direction along the plane of the film during deposition.

10. The method of claim 1 being particularly characterized in that the temperature of the bath is maintained between about 22° and 30° C.

References Cited by the Examiner

UNITED STATES PATENTS

| | | | |
|---|---|---|---|
| 3,047,475 | 7/1962 | Hespenheide | 204—43 |
| 3,065,105 | 11/1962 | Pohm | 204—43 XR |
| 3,098,803 | 7/1963 | Godycki et al. | 204—43 XR |

FOREIGN PATENTS

| | | |
|---|---|---|
| 420,248 | 11/1934 | Great Britain. |

JOHN H. MACK, *Primary Examiner.*

G. KAPLAN, *Assistant Examiner.*